INVENTORS
Fred T. Roberts
Robert E. Roberts
BY
Johnson and Kline
ATTORNEYS

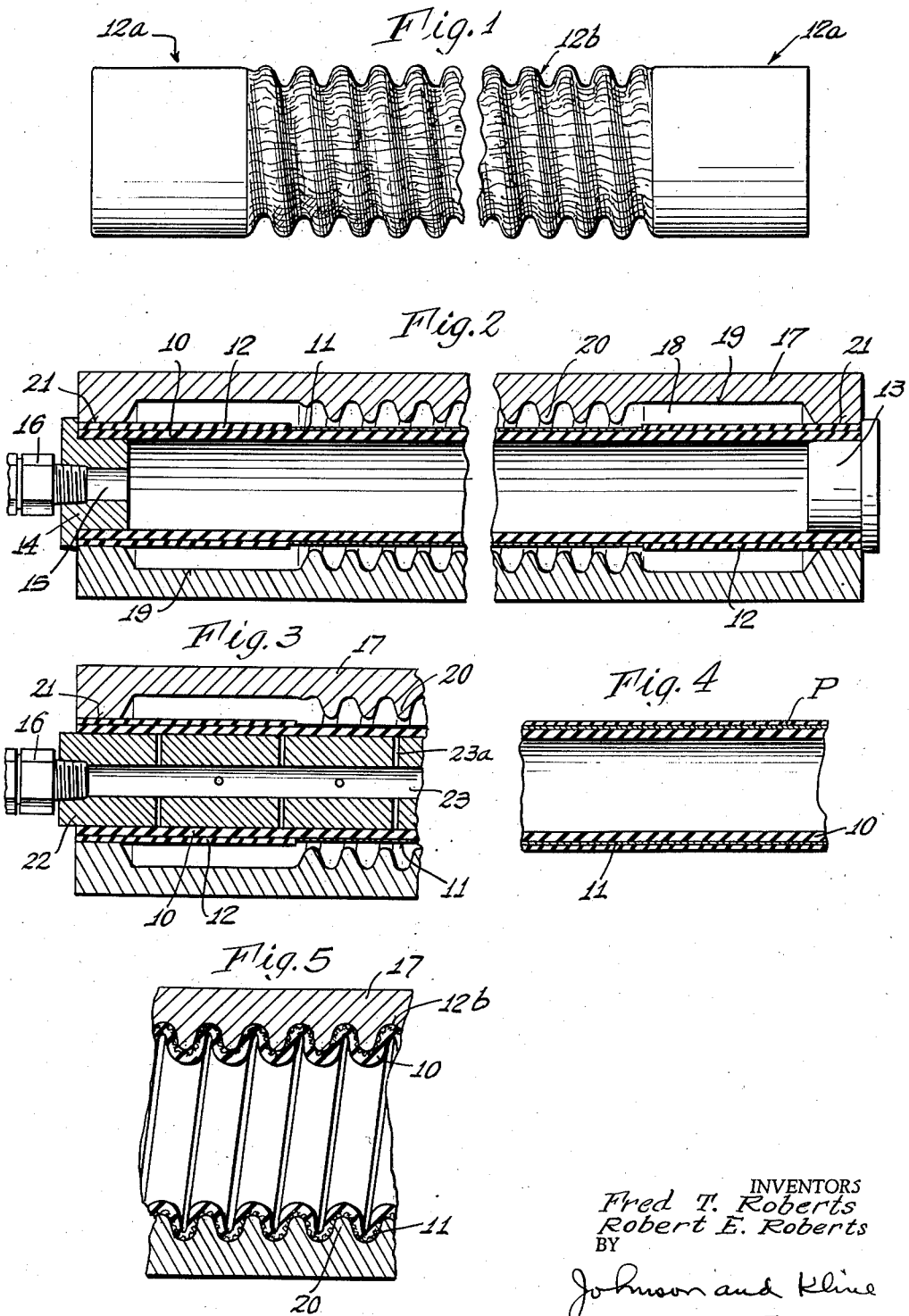

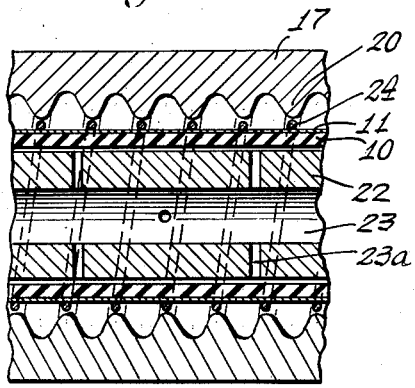
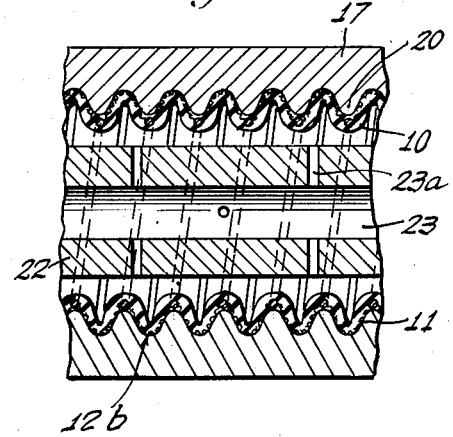
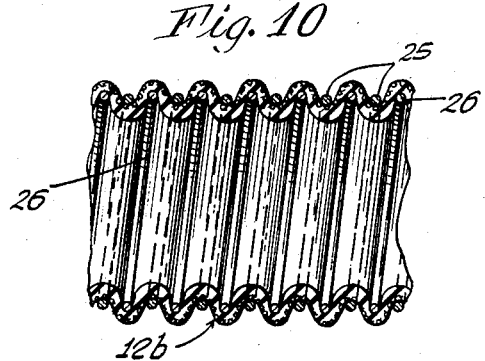
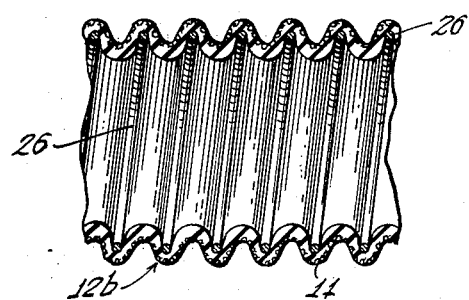
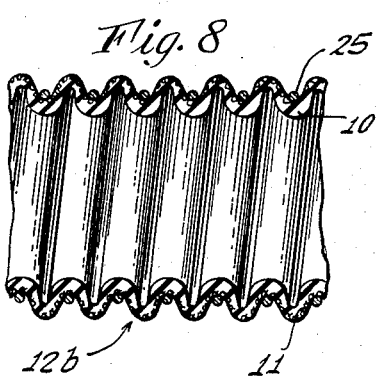
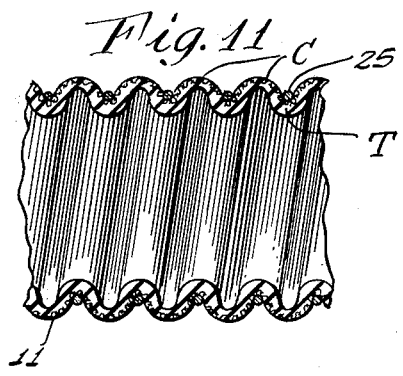
INVENTORS
Fred T. Roberts
Robert E. Roberts
BY
Johnson and Kline
ATTORNEYS Aug. 4, 1959  F. T. ROBERTS ET AL  2,897,840
HOSE AND METHOD OF MAKING SAME
Filed June 10, 1957  3 Sheets-Sheet 3

United States Patent Office 2,897,840
Patented Aug. 4, 1959

2,897,840

HOSE AND METHOD OF MAKING SAME

Fred T. Roberts and Robert E. Roberts, Wilton, Conn.

Application June 10, 1957, Serial No. 664,520

17 Claims. (Cl. 138—56)

The present invention relates to a novel method of making a helically corrugated reenforced hose and to the hose made by the same.

Heretofore, in making fabric reenforced hose, it has been the practice to extrude a tube and thereafter braid over it a tubular braid, or apply stockinette around it and then run the tube having the braid or the like through a second tubing machine to apply another layer to provide a covering layer over it to fill up the interstices in the braid and provide a smooth outer surface. The hose has then been cured.

It is an object of the present invention to provide a novel method of making helically corrugated fabric reenforced hose in which a smooth molded outer surface may be provided.

This is accomplished by providing at least one layer of stretchable open mesh fabric over a body of elastomeric material, inserting the same in a mold having a helically corrugated wall and in applying internal pressure to the body to cause the stretchable fabric to stretch to its limit and the material of the body to be forced through the open mesh of the fabric and into engagement with the walls to provide a helically corrugated' wall with a smooth molded outer surface.

If desired, metal reenforcements can be folded into the hose. However, it is at present preferred to mold the hose with its helical corrugations and to provide a rust-resistant metallic reenforcement on the exterior of the hose to lie in the troughs of the corrugations to resist outward expansion of the hose under pressure or to insert into the interior of the hose a preformed helical rust-resistant spring wire to lie in the crests of the corrugations so as to resist collapse and contraction of the hose due to suction or reduced pressure within the hose. Where the hose is subject to both internal pressure and suction at different times, the hose can be provided with both sets of metallic reenforcements.

A feature of the present invention resides in the fact that the main body of the hose can be formed as a helically corrugated body and thereafter the metal reenforcements applied to the hose in accordance with the requirements which the hose is to have.

Further, the present invention lends itself to the formation of helically corrugated, fabric reenforced radiator hose for automobiles, especially for original equipment purchasers in which the hose is curved to conform to the space requirements in the automobile. In this case the reenforced fabricated tube, preferably of rubber or the like thermosetting material, is cut to length and is inserted into the mold and given an initial molding operation in which the walls of the hose are helically corrugated. The hose is given a partial cure and is removed from the mold. It is then bent to the desired shape and the curing completed to set the hose in final curved form.

With the present invention the corrugations in the body of the hose, in addition to providing a reenforcement for the hose, permit it to be readily curved to the required shape since the corrugations on the outer part of the bend or curve are spread or extended sufficiently to permit the bend, while those on the inner part of the curve or bend are moved together or contracted sufficiently to accommodate the material of the hose within the bend. The hose thus constructed eliminates the necessity of using a thin metal tube bent to the desired curve of the hose which was heretofore used in making uncorrugated bent hose of the required shape and which presented a problem of removal of the cured hose from the bent mandrel. In the final curing of the hose, shims can be inserted into the ends of the hose which are adapted to form the attaching portions and can be utilized to aid in holding the hose in its desired shape during the final curing operation.

It will be apparent that the hose thus supported during the final setting thereof in bent shape will be open to the steam and have the same pressure inside the hose as on the outside.

The reenforcing corrugations of the hose will, under normal circumstances, provide the wall with sufficient reenforcement to withstand normal pressures after the final cure is given to set the hose. However, if additional reenforcements are desired, wire having a rust-proofed surface can be applied either to the interior or exterior of the hose as indicated in connection with the straight hose.

The hose, according to the present invention, can be made in long lengths, such as are used for garage exhaust hose, can be made into short lengths of suitable shape such as are used in automobile radiator hose and the like, or several pieces of such radiator hose may be made all joined together and then severed after being molded.

Other features and advantages of the invention will be apparent from the specification and claims when considered in connection with the accompanying drawings in which:

Figure 1 shows a side view of the hose with the fabric reenforcement, indicated in shadow with the smooth molded exterior surface.

Fig. 2 is a sectional view of a two-part mold with the hose in position to be molded, the hose being closed by end plugs.

Fig. 3 is a fragmentary view of a mold with a mandrel supporting the hose in the mold.

Fig. 4 shows a view of another form of hose body before molding.

Fig. 5 shows a view similar to Fig. 2 of a section of the hose blown against the walls to mold the hose into its corrugated form.

Fig. 6 is a fragmentary sectional view of a mold in which the laminated hose body is provided with reenforcing springs in position to be molded into the hose.

Fig. 7 is a view similar to Fig. 6 showing the blown and molded hose.

Fig. 8 is a fragmentary view of a molded hose with the metal reenforcement on the exterior surface thereof.

Fig. 9 is a fragmentary view similar to Fig. 8 of the molded hose with the preformed reenforcement on the interior thereof.

Fig. 10 shows a fragmentary view of a hose with the metal reenforcemeint on the exterior and interior.

Fig. 11 is a view similar to Fig. 8 of a hose having corrugations therein in which the trough portion is narrow and the crest portion is of a greater radius.

Figure 12:
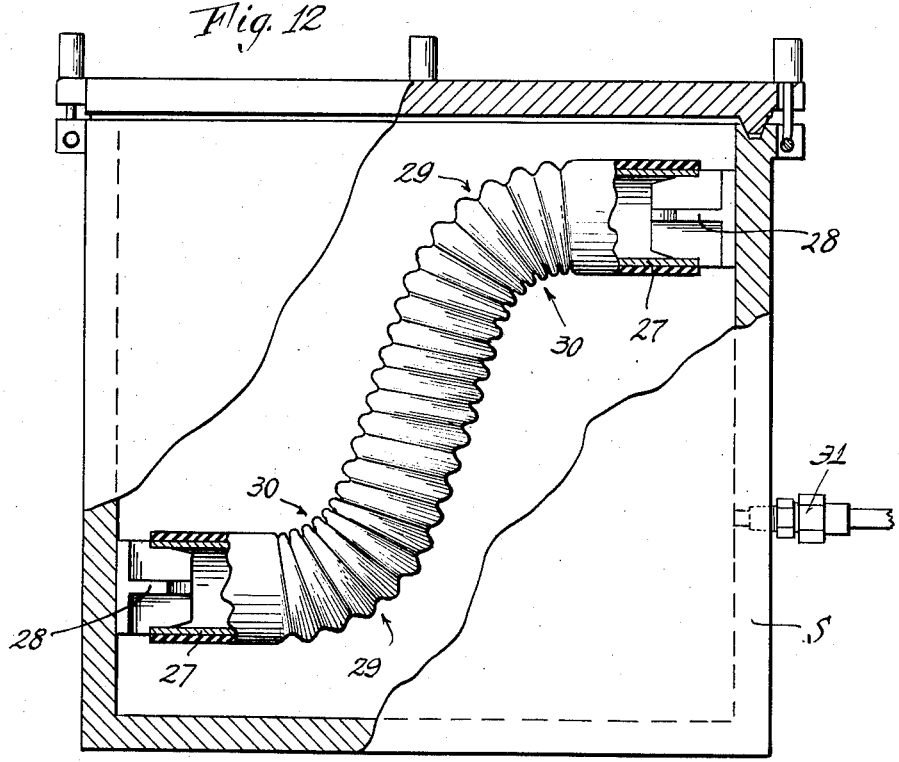
Fig. 12 shows a curved hose being set in final shape.

As shown in Figs. 1 and 2 of the drawings, the body of the hose comprises an inner layer 10 of elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof). This layer can be formed of an extruded tube or a plurality of wound layers of elastomeric material sufficient to provide the required thickness of the hose wall. A jacket 11 of stockinette, braid or other stretchable open mesh fabric is provided over at least that part of the body which is adapted to form the corrugated body of the hose. At the end portions and such other portions of the body which are adapted to form the attaching portions of the hose, an extra layer of elastomeric material 12 and/or fabric material impregnated with elastomeric material is provided so as to produce a thickened attaching portion 12a for the hose adapted to be inserted over the usual tubular connectors (not shown).

When relatively short hose sections are formed in separate pieces they can be molded without a mandrel. This is shown in Fig. 2 wherein the ends of the body are provided with plugs 13, 14, the plug 13 being a closing plug while the plug 14 is provided with a bore 15 therein having a nipple 16 which may be connected to a source of fluid under pressure (not shown). The assembled body with the plugs is inserted in a two-part mold 17 having a molding cavity 18 in which cylindrical portions 19 are provided for molding the attaching portions of the hose and the remaining part of the wall of the mold cavity is provided with a helical rib 20 to form a helically corrugated wall therefor. The end portions 21 of the mold grip the body against the plug and effectively seal the same. As shown, the mold cavity is larger than the body so that when fluid pressure is applied to the interior body of the hose through the nipple and plug 14 it will cause the body to expand and the fabric to be stretched substantially to its limit and will cause the body material which is in a moldable condition to be forced through the interstices in the fabric and into engagement with the walls of the cavity, thus providing a molded body having cylindrical attaching portions 12a and a helically corrugated wall 12b having a smooth, uniform, and accurately formed outer surface.

The hose is then set in its molded form. If the elastomeric material is rubber or rubber-like materials, it is vulcanized or cured and if it is a thermoplastic, it is cooled to set the body in its molded shape.

In cases where a relatively long hose is to be formed which may or may not be severed into shorter hose sections, it is preferred to support the body in the mold by a mandrel 22, as shown in Fig. 3, which extends for the full length of the assembled hose body. The end portions 21 of the mold clamp the body against the mandrel and seal the same. The mandrel has a bore 23 adapted to be connected by nipple 16 to a source of fluid pressure. Passages 23a are provided in the mandrel to extend from the bore 23 to the surface of the mandrel whereby the fluid pressure is transmitted to the interior of the body to cause it to be forced outwardly and into molding engagement with the walls of the mold cavity.

If it is desired to use a tube larger than the supporting mandrel and so that the mold cavities may be closed without pinching the tube, vacuum may be applied to the mandrel to draw the tube tightly against the supporting mandrel.

While a plurality of layers, each of fabric and elastomeric material may be used, the hose is herein illustrated in Figs. 1–3 and 5 as having a single layer of elastomeric material 10 disposed under a single jacket or cover 11 of stretchable fabric. In Fig. 4, however, the fabric has been provided with a protective layer P of elastomeric material so that the fabric is completely embedded in the hose body before molding. However, during the molding operation the fabric will be stretched to its limit as the body is forced outwardly into engagement with the mold cavity and will provide the reenforced structure of the body.

Under some circumstances it may be desired to incorporate into the body of the hose a metallic reenforcement. This is accomplished, as shown in Fig. 6, by providing on the body of the hose, such as shown in Fig. 3, a helical spring 24 adapted to be positioned therearound. As herein illustrated, the spring 24 is located on the body adjacent the crests of the corrugations of the mold wall so that when fluid pressure is applied and the body is blown, the spring will be embedded in the troughs of the finished hose as shown in Fig. 7. It will be noted, however, that as the fabric is stretched it will lie under the reenforcements and be thoroughly embedded in the hose while the material of the body passes out through the interstices around the spring, and into engagement with the walls of the mold and forms a smooth molded surface.

The molded hose of the present invention can be used without reenforcements where pressure conditions in the hose are normal or at atmospheric pressure. However, if the hose is to be used in situations where the pressure is abnormal, that is, high or low pressures, or a suction, the hose can be readily provided with additional reenforcements to withstand these conditions. For example, if the molded hose is to be used in a situation in which high pressures are to be handled it can have a metal reenforcement 25 positioned around the hose and in the troughs of the corrugations as shown in Fig. 8. This can be wound into position and formed on the molded hose or can be a preformed coiled spring which is expanded in diameter and positioned over the molded hose and then released so as to contract and be located in the troughs. Preferably, the reenforcements are rust resistant, being formed of rust-resistant metal or provided with a rust-resistant coating or surface.

If the hose is to be subjected to internal suction, internal reenforcements can be provided for preventing collapse of the hose. This can be readily accomplished by inserting a preformed helically coiled spring 26 within the hose so as to lie within the crests of the corrugations as shown in Fig. 9. This can be accomplished by twisting the spring to reduce its diameter, inserting it into position within the hose and releasing it to expand into engagement with the inner surface of the crests of the corrugations.

When the hose is to be utilized under conditions where it is exposed to high pressures and to suction, it can be readily provided with reenforcements 25 in the troughs and reenforcements 26 in the crests as shown in Fig. 10.

Thus it will be seen that the hose of the present invention is very versatile and can be readily manufactured by the herein novel method to meet the particular requirements for the hose.

By selecting the proper design of corrugation in the wall of the mold, the hose can be formed to meet various requirements. In the form of hose shown in Fig. 11, it will be noted that the crests C of the corrugations are formed with an arc of large radius while the troughs T are formed with an arc of a very short radius. This will permit the hose to receive the reenforcing member 25 on the outside and confine it closely by the narrow troughs, yet the arc of large radius will permit a greater flexing of the wall as the hose is extended and contracted.

The present invention lends itself well to the formation of helically corrugated, fabric reenforced hose having predetermined curved shapes such as are used as radiator and the like connections. The hose is made of thermosetting elastomeric material such as rubber (natural or synthetic) or the like material capable of being partially cured and thereafter set in final shaped form. The body of the hose of the required length is formed of elastomeric material and open mesh fabric and is initially molded in the manner described in connection with Fig. 2 and Fig. 3 to provide a helically corrugated body with cylindrical attaching portions. This is partially or semi-cured to hold it in molded form. The hose is then removed from the mold and is given its curved shape and supported in a steam chamber S as shown in Fig. 12. Preferably, shims 27 are inserted in the attaching portions and support the hose on finned brackets 28 in the desired curved shape. It will be noted that the portions 29 of the corrugations on the outside of the curves are spread or extended while the portions 30 of the corrugations on the inner part of the curves are moved together or contracted to permit the bends or curves to be formed as required. Steam is admitted into the chamber S through the fitting 31 and fills the chamber and applies pressure to the interior and exterior of the hose and the hose is vulcanized or cured to finally set it in its final curved form.

It has been shown in the drawings that the connecting end portions may be reenforced and blown up from the mandrel which is the preferred way. They may, however, be molded with an inner bore with shims molding the bore as shown in our application Serial No. 643,153, filed February 28, 1957, or blown up as shown and thereafter have shims inserted to give the proper bore of the connections as shown in Fig. 12.

Further, while Figs. 2 and 3 show only end portions of the mold and hose therein, it is to be understood that they can be made in multiple lengths by arranging the cylindrical portions and corrugated portions in the mold cavity to provide the required number of hose sections which, after molding, may be severed through the cylindrical portions as desired into individual hose lengths.

Variations and modifications may be made within the scope of the claims and portions of the improvements may be used without others.

We claim:

1. The method of making a fabric reenforced, helically corrugated flexible hose comprising applying an open mesh, stretchable fabric over a tube of moldable elastomeric material, inserting the assembly into a heated mold cavity of larger diameter than the assembly and having helically corrugated walls, applying fluid pressure to the interior of the tube to expand the tube and stretch the open mesh fabric and to cause the elastomeric material to be pressed through the open mesh in said fabric and into engagement with the corrugated walls of the mold cavity to mold the corrugated hose, and setting the hose in molded shape.

2. The method of making a fabric reenforced, helically corrugated flexible hose comprising forming a tubular assembly of one or more layers of an open mesh, stretchable fabric and a moldable elastomeric material, inserting the assembly in a mold cavity of larger diameter than said assembly and having helically corrugated walls, applying fluid perssure to the interior of the assembly and expanding the assembly with the open mesh fabric stretching to its limit and the elastomeric material being pressed through the open mesh in said fabric and into engagement with the corrugated walls of the mold cavity to form the corrugated hose, and setting the hose in molded shape.

3. The method of making a reenforced, helically corrugated flexible hose comprising forming a tubular body of a moldable elastomeric material, inserting the body in a mold cavity of larger diameter than said assembly and having helically corrugated walls, applying fluid pressure to the interior of the assembly and expanding the body into engagement with the corrugated walls of the mold cavity to form the corrugated hose, setting the hose in molded shape, and thereafter inserting a continuous, preformed, rust-proofed helical spring into the interior of the set hose to extend for the full length of the corrugations thereof and to lie in the crests of the corrugations and prevent the hose from contracting thereat.

4. The method of making a reenforced, helically corrugated flexible hose comprising forming a tubular body of a moldable elastomeric material, inserting the body in a mold cavity of larger diameter than said assembly and having helically corrugated walls, applying fluid pressure to the interior of the assembly and expanding the body into engagement with the corrugated walls of the mold cavity to form the helically corrugated hose, setting the hose in molded shape, and thereafter applying a continuous preformed, rust-proofed helical spring to the exterior of the set hose to extend for the full length of the corrugations thereof and to lie in the troughs of the corrugations and prevent the hose from expanding thereat.

5. The method of making a reenforced, helically corrugated flexible hose comprising forming a tubular body of a moldable elastomeric material, inserting the body in a mold cavity of larger diameter than said assembly and having helically corrugated walls, applying fluid pressure to the interior of the assembly and expanding the body into engagement with the corrugated walls of the mold cavity to form the corrugated hose, setting the hose in molded shape, and thereafter inserting a continuous, preformed, rust-proofed helical spring into the set hose to extend for the full length of the corrugations thereof and to lie in the crests of the corrugations to prevent the hose from contracting thereat, and thereafter applying a continuous, rust-proofed helical spring to the exterior of the set hose to extend for the full length of the corrugations thereof and to lie in the troughs of the corrugations and prevent the hose from expanding thereat.

6. The method of making a fabric reenforced, helically corrugated flexible hose comprising applying an open mesh, stretchable fabric over a tube of moldable elastomeric material, inserting the assembly into a mold cavity of larger diameter than the assembly and having helically corrugated walls, applying fluid pressure to the interior of the tube to expand the tube and stretch the open mesh fabric and to cause the elastomeric material to be pressed through the open mesh in said fabric and into engagement with the corrugated walls of the mold cavity to mold the hose, setting the hose in molded shape, and thereafter applying a continuous, rust-proofed steel wire in spiral convolutions around the set hose to extend for the full length of the corrugations thereof and with the coils of the wire disposed in the troughs of the corrugations in said hose to resist expansion of the hose thereat.

7. The method of making a fabric reenforced, helically corrugated flexible hose comprising applying an open mesh, stretchable fabric over a tube of moldable elastomeric material, inserting the assembly into a mold cavity of larger diameter than the assembly and having helically corrugated walls, applying fluid pressure to the interior of the tube to expand the tube and stretch the open mesh fabric and to cause the elastomeric material to be pressed through the open mesh in said fabric and into engagement with the corrugated walls of the mold cavity to mold the hose, setting the hose in molded shape, and thereafter inserting a preformed, rust-proofed helical spring into the hose to engage and support the inner surface of the crests of the helical corrugations of the hose against collapse of the hose thereat.

8. The method of making a fabric reenforced, helically corrugated flexible hose comprising applying an open mesh, stretchable fabric over a tube of moldable elastomeric material, inserting the assembly into a mold cavity of larger diameter than the assembly and having helically corrugated walls, applying fluid pressure to the interior of the tube to expand the tube and stretch the open mesh fabric and to cause the elastomeric material to be pressed through the open mesh in said fabric and into engagement with the corrugated walls of the mold cavity to mold the hose, setting the hose in molded shape, and thereafter inserting a preformed, rust-proofed helical spring into the hose to engage and support the inner surface of the crests of the helical corrugations of the hose against collapse of the hose thereat and applying a second preformed, rust-proofed helical spring around the hose with the coils of the spring disposed in the troughs of the corrugations in said hose to resist expansion of the hose thereat.

9. The method of making a curved, fabric reenforced, helically corrugated flexible hose comprising applying an open mesh fabric over a tube of moldable rubber material, inserting the assembly in a mold cavity having corrugated walls, applying fluid pressure to the interior of the tube and expanding the tube with the open mesh fabric stretching to its limit, said rubber material being pressed through the open mesh in said fabric and into engagement with the helically corrugated walls of the mold cavity to form the corrugated hose, partially curing the hose in molded shape, removing the corrugated hose from the mold, bending the hose to the desired curvature, and completing the curing of the hose to set the hose in the curved form.

10. The method of making a curved, fabric reenforced, helically corrugated flexible hose comprising forming a tubular assembly of one or more layers of an open mesh, stretchable fabric and a moldable thermosetting material, inserting the assembly in a mold cavity of larger diameter than said assembly and having corrugated walls, applying fluid pressure to the interior of the assembly and expanding the assembly with the open mesh fabric stretching to its limit and the thermosetting material being pressed through the open mesh in said fabric and into engagement with the helically corrugated walls of the mold cavity to form the helically corrugated hose, heating and partially setting the hose in molded shape, removing the partially set hose from the mold, bending the hose into the desired curvature with the corrugations on the outside of the bend extending and the corrugations on the inside of the bend contracting, and heating the hose to completely cure and set the hose in the curved shape.

11. A mold-formed helically corrugated reenforced hose comprising a tubular body of moldable elastomeric material having at least one tubular layer of stretchable open mesh fabric therein, said body having helically corrugated walls with the fabric thereof being in stretched condition to conform to the corrugations of the walls and with the elastomeric material extending through the mesh in the fabric and forming a smooth outer surface on the helically corrugated wall.

12. A mold-formed helically corrugated reenforced hose comprising a tubular body of moldable elastomeric material having at least one tubular layer of stretchable open mesh fabric therein, said body being set in final form and having helically corrugated walls with the fabric thereof being in stretched condition to conform to the corrugations of the walls and with the elastomeric material extending through the mesh in the fabric and forming a smooth outer surface on the helically corrugated wall, a rust-proofed helical spring disposed over the corrugated wall and resting in the troughs of the helical corrugations to resist outward expansion of the hose thereat, and a rust-proofed, preformed, helical spring insert within the hose and resting in the crests of the helical corrugations to resist inward deformation of the hose thereat.

13. A mold-formed helically corrugated reenforced hose comprising a tubular body of moldable elastomeric material having at least one tubular layer of stretchable open mesh fabric therein, said body being set in final form and having helically corrugated walls with the fabric thereof being in stretched condition to conform to the corrugations of the walls and with the elastomeric material extending through the mesh in the fabric and forming a smooth outer surface on the helically corrugated wall, and a rust-proofed helical spring disposed over the corrugated wall and resting in the troughs of the helical corrugations to resist outward expansion of the hose thereat.

14. A mold-formed helically corrugated reenforced hose comprising a tubular body of moldable elastomeric material having at least one tubular layer of stretchable open mesh fabric therein, said body being set in final form and having helically corrugated walls with the fabric thereof being in stretched condition to conform to the corrugations of the walls and with the elastomeric material extending through the mesh in the fabric and forming a smooth outer surface on the helically corrugated wall, and a preformed, rust-proofed helical spring insert within the hose and resting in the crests of the helical corrugations to resist inward deformation of the hose thereat.

15. A curved, fabric reenforced hose comprising a tubular body of moldable thermosetting material having at least one tubular layer of open mesh fabric therein, said body being formed with helically corrugated walls with the fabric therein being in a condition wherein the fabric is stretched to the limit thereof and conforms to the corrugations of the walls and the elastomeric material extends through the mesh in the fabric and forming a smooth outer surface on the helically corrugated wall, and being curved intermediate the ends thereof with the corrugations on the outside of the curve being extended and the corrugations on the inside of the curve being contracted.

16. The method of making a fabric reenforced helically corrugated flexible hose comprising applying an open mesh, stretchable fabric over a tube of moldable elastomeric material, positioning a helical spring around said tube and fabric, inserting the assembly into a heated mold cavity of larger diameter than the assembly and having helically corrugated walls with the spring located adjacent the crests of the corrugations of said mold walls, applying fluid pressure to the interior of the tube to expand the tube and stretch the open mesh fabric and to cause the elastomeric material to be pressed through the open mesh in said fabric, around said spring, and into engagement with the corrugated walls of the mold cavity to mold the corrugated hose with a smooth wall, and setting the hose in molded shape.

17. A mold-formed helically corrugated reenforced hose comprising a tubular body of moldable elastomeric material having therein at least one tubular layer of stretchable open mesh fabric with a helical spring disposed thereover and engaged therewith, said body having helically corrugated walls with the spring located in said walls in predetermined relation to the corrugations and the fabric thereof being in stretched condition to conform to the corrugations of the walls and with the elastomeric material extending through the mesh in the fabric and around said spring and forming a smooth outer surface on the helically corrugated wall.

References Cited in the file of this patent

UNITED STATES PATENTS

| | | |
|---|---|---|
| 1,324,850 | Roberts | Dec. 16, 1919 |
| 1,864,861 | Schaller | June 28, 1932 |
| 2,291,545 | Ganz et al. | July 28, 1942 |
| 2,449,265 | Williams | Sept. 14, 1948 |
| 2,452,432 | Collins | Oct. 26, 1948 |
| 2,490,513 | Dreyer | Dec. 6, 1949 |
| 2,690,769 | Brown | Oct. 5, 1954 |
| 2,739,616 | Duff | Mar. 27, 1956 |
| 2,780,274 | Roberts et al. | Feb. 5, 1957 |